United States Patent

[11] 3,633,054

[72] Inventors Eugen Wiedeman, deceased
late of Baden, Switzerland;
Peter Voser, administrator, 540 Boda
Neustadhaf Melliuguersh 1, Baden,
Switzerland
[21] Appl. No. 885,489
[22] Filed Dec. 16, 1969
[45] Patented Jan. 4, 1972
[73] Assignee Aktiengesellschaft Brown Boveri & Cie,
Baden, Switzerland
[32] Priority Feb. 21, 1969
[33] Switzerland
[31] 2705/69

[54] ARRANGEMENT FOR COOLING THE POLES OF A DYNAMOELECTRIC MACHINE
1 Claim, 1 Drawing Fig.

[52] U.S. Cl. .................................................. 310/54, 310/64
[51] Int. Cl. .................................................. H02k 9/00
[50] Field of Search ...................................... 310/54, 59, 58, 60, 61, 64, 213, 225, 227, 269, 182, 197

[56] References Cited
UNITED STATES PATENTS

| | | | |
|---|---|---|---|
| 3,230,487 | 1/1966 | Pellecchia | 310/197 |
| 1,715,866 | 6/1929 | Rother | 310/58 |
| 2,722,616 | 11/1955 | Moses | 310/54 |
| 2,749,457 | 6/1956 | Kilner | 310/64 |
| 3,032,665 | 5/1962 | Wilhelmson | 310/54 |
| 3,154,706 | 10/1964 | Richardson | 310/54 |
| 3,157,806 | 11/1964 | Wiedemann | 310/64 |
| 3,463,952 | 8/1969 | Norris | 310/58 |

Primary Examiner—D. F. Duggan
Assistant Examiner—R. Skudy
Attorney—Pierce, Scheffler & Parker ABSTRACT: An arrangement for cooling the pole shoes of a leg-type pole dynamo electric machine includes a metal frame which is arranged on and surrounds the pole core between the pole coils and the pole shoe. The metal frame which lies in direct contact with the pole shoe is provided with internal channels through which a liquid coolant is circulated and also constitutes a closed loop which thereby also establishes a single-turn short circuit winding on the pole core.

PATENTED JAN 4 1972
3,633,054
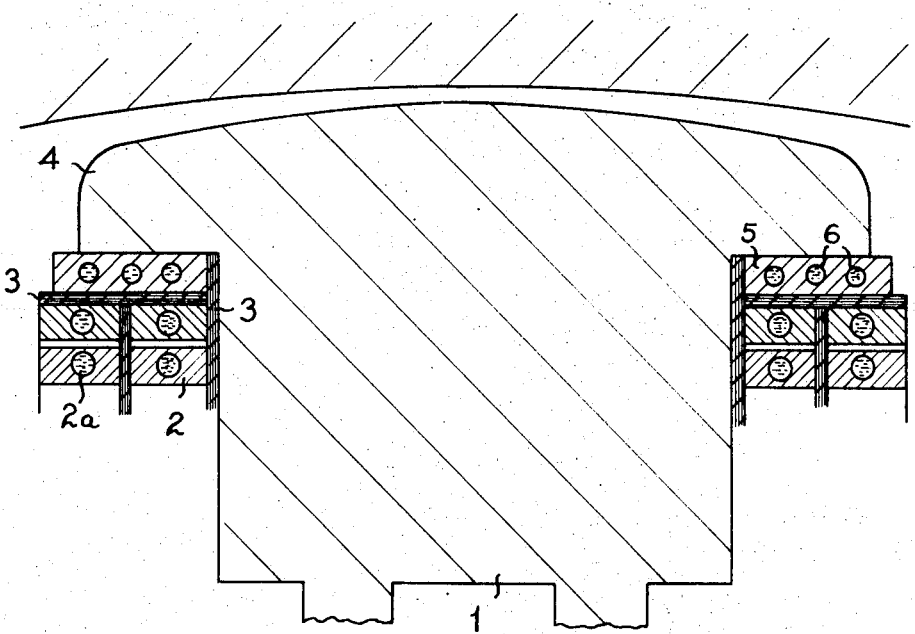
INVENTOR.
Eugen Wiedemann (Deceased)
BY
Peter Voser, Administrator

ARRANGEMENT FOR COOLING THE POLES OF A DYNAMOELECTRIC MACHINE

This invention relates to dynamoelectric machines and more particularly to an improvement in the means for cooling the pole shoes of such a machine in which the poles are of the leg type.

In the case of dynamoelectric machines having poles of the leg type and wherein insulation must always be provided between the pole coils of the field winding and the pole iron, the heat due to energy losses produced in the iron of the pole shoes can only be eliminated by way of the airgap or through the pole core. The pole coil itself absorbs only an insignificant portion of this heat even in the case where the coil is wound from tubular conductor material through which a fluid coolant is circulated to conduct the heat away.

In dynamo electric machines of the foregoing type, considerable differences in temperature can therefore appear between the pole shoe and the field winding, particularly in the case of an asynchronous start of the machine, and these temperature differences exert a considerable stress on the intermediate insulation. Moreover, the pole may undergo considerable bending caused by the different expansions of pole shoe and pole core, which can lead to increased stresses on the pole claws and finally to loosening of the pole mounting. All these phenomena are a result of a too slow elimination of the heat from the pole shoe.

The principal object of the invention is thus to provide an improved arrangement for cooling the pole shoes of a leg-type pole machine by means of a fluid coolant, particularly a liquid, which results in a very effective heat elimination so that the above-mentioned thermal expansions, which occur in the case of the previously known cooling arrangements, are avoided. This objective is attained in that a liquid cooled metal frame surrounds the pole leg in direct contact with the pole shoe and located between the latter and the field winding coil on the pole leg.

A preferred embodiment of the invention will now be described and is illustrated in the accompanying drawing in which the pole shoe with the improved cooling arrangement is shown in longitudinal section.

With reference now to the drawing, the core portion of the field pole of the machine is indicated at 1 and is seen to be provided with coils 2 of the field winding which are electrically insulated from the pole core by layers of insulation 3. The coils 2 can consist, for example, of tubular conductors which are directly cooled by means of circulating a coolant liquid through the interior channels 2a. A metal frame 5 is located on the pole core 1 between the coils 2 and the pole shoe 4 and is seen to be in direct contact with the surface of the pole shoe. The frame 5 which can be made from bronze is likewise provided with interior channels 6 through which a coolant liquid is circulated, the liquid serving to rapidly carry away the heat produced in the pole shoe. The channels 6 in the frame 5 and the channels 2a in the field winding coils 2 are preferably connected up to the same cooling system. The frame 5 is also preferably designed as a closed, i.e. a loop element surrounding the pole core thus to constitute a single turn short-circuit winding.

The rapid and very effective elimination of the heat generated in the pole shoe due to loss of energy, which is achieved with the above-described construction results in the following essential advantages.

Successive asynchronous starts of the machine in shorter intervals than heretofore are readily possible.

The temperature differences on both sides of the insulation provided between the pole coils and the core remain very small, so that the mechanical stresses of the insulation due to unequal thermal expansions remain negligible.

The otherwise required strong cooling air along the pole shoe surface can be substantially reduced.

If the metal frame between the pole shoe and pole coils is designed as a closed, short-circuit winding, a part of the starting energy is produced in the frame itself so that the pole shoe is relieved.

The efficiency of the machine is increased and greater safety is achieved which is of paramount importance particularly in frequently utilized machines having a great core length, for example, in motor generators for pump storage stations.

I claim:

1. In a dynamoelectric machine of the type having leg-type poles and pole shoes thereon at the ends of the poles, the improvement which comprises a flat metallic frame forming a loop surrounding the pole directly beneath and in direct contact with a flat face of the pole shoe, a channel provided within and extending around said frame and through which a liquid coolant is circulated thereby to effect removal of heat from said frame and hence also from said pole shoe, an energizing coil of the hollow conductor type surrounding the leg portion of said pole and through which a liquid coolant is circulated an insulating layer provided between said energizing coil and said metallic frame and a further insulating layer provided on the leg portion of said pole for insulating said leg portion from said metallic frame and also from said energizing coil.

* * * * *